Figure 1:
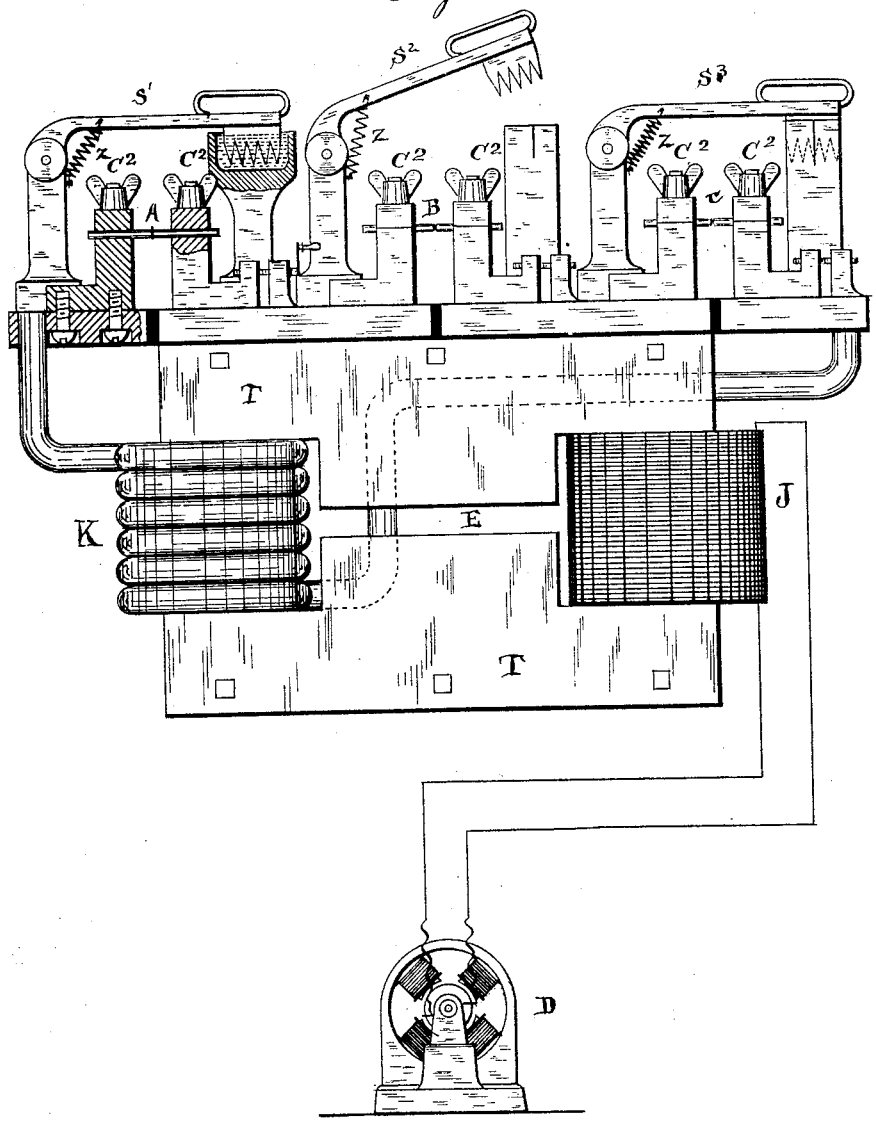

(No Model.) 2 Sheets—Sheet 1.

E. THOMSON.
ELECTRIC WELDING APPARATUS.

No. 532,838. Patented Jan. 22, 1895.

Witnesses
Thos H. Capel
Thos. F. Conrey

Inventor:
Elihu Thomson,
By
H. C. Townsend
Attorney.

(No Model.) 2 Sheets—Sheet 2.

E. THOMSON.
ELECTRIC WELDING APPARATUS.

No. 532,838. Patented Jan. 22, 1895.

Witnesses:
Wm H Capel
Thos. F Conley

Inventor:
Elihu Thomson.
By H C Townsend
Attorney.

UNITED STATES PATENT OFFICE.

ELIHU THOMSON, OF LYNN, MASSACHUSETTS, ASSIGNOR TO THE THOMSON ELECTRIC WELDING COMPANY, OF MAINE.

ELECTRIC WELDING APPARATUS.

SPECIFICATION forming part of Letters Patent No. 532,838, dated January 22, 1895.

Application filed August 13, 1889. Serial No. 320,654. (No model.)

*To all whom it may concern:*

Be it known that I, ELIHU THOMSON, a citizen of the United States, and a resident of Lynn, in the county of Essex and State of Massachusetts, have invented certain new and useful Electric Welding Apparatus, of which the following is a specification.

My present invention relates to that class of metal working apparatus in which electric currents of considerable volume passed through or in contiguity with the work are employed as the means of heating the metal operated upon, as in welding, brazing, soldering, forging, riveting and other operations of a similar character. I shall, however, in the following description, set out my invention by reference to its employment in connection with clamps or holders for electric welding, it being understood, however, that I do not limit myself to such application of the invention but include any metal working operations in which a metal heating current is caused to pass through the metal to be heated while the latter is in position between suitable conducting clamps or abutments as now well understood in the art.

My invention relates to improvements whereby, in the case of electric welding, a number of pieces of metal may be simultaneously joined or welded by an electric current, or whereby they may be successively joined, if desired, the current necessary for the operation coming from a single source.

Briefly, my invention consists in constructing a number of clamps in series so that they may all be used together or independently of each other while they are, however, supplied with current from the same source.

In a patent granted to me dated July 17, 1888, No. 386,441, I have shown a plurality of welding clamps supplied with current from a single source, but my present invention is distinguished and different therefrom in that in the present instance, the current generated is of constant, or approximately constant, strength or amount, while the pieces of metal to be welded are arranged in series and between the terminals of the generator, and a shunt, which may be made variable in capacity for current is provided around the work, or other suitable means are employed for regulating the flow of current to the clamps for cutting off and turning on such current at pleasure.

The invention relates also to certain devices used in connection with the apparatus and constructed as will be hereinafter more fully set forth in connection with the accompanying drawings.

My invention has the advantage of permitting a single source of current to be used economically for operating a number of welding clamps at different positions on the work bench, and allows each operator to control the work to be accomplished independently of the other operators working their clamps. Any form of clamps may, of course, be employed, in accordance with the work to be done. In fact my invention is applicable to any of the various forms of electric welding apparatus which I have described in prior patents.

Figure 2:
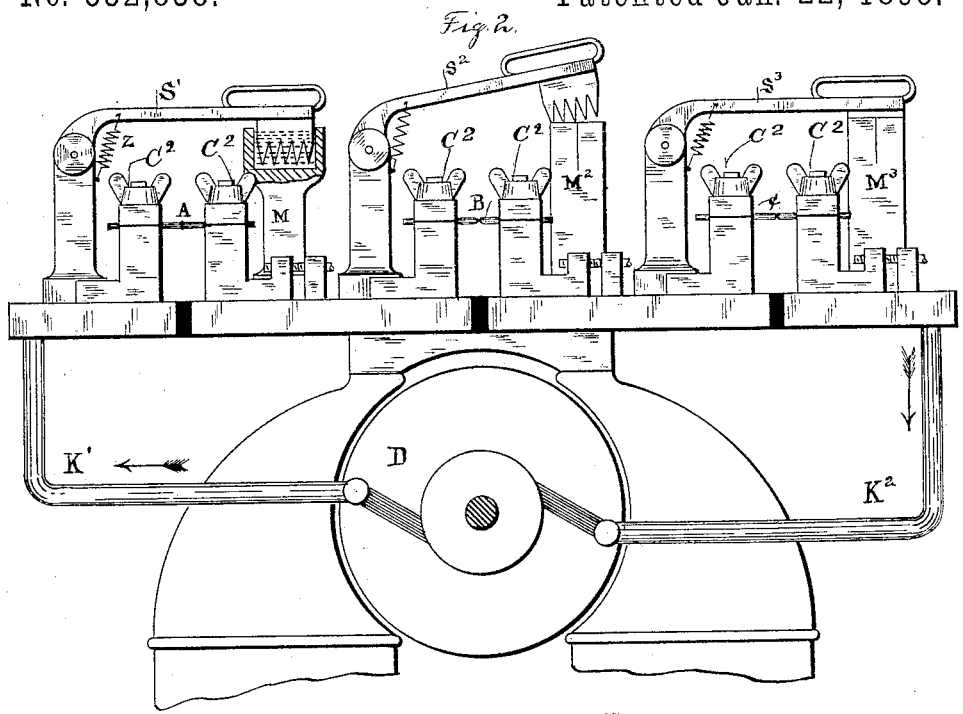
Figure 3:
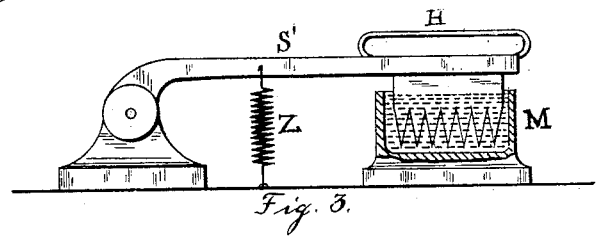
Figure 4:
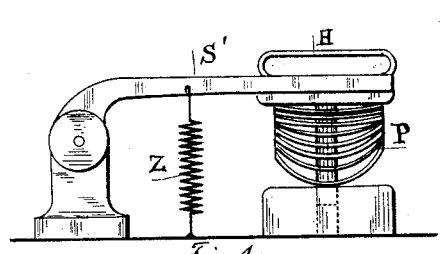
Figure 5:
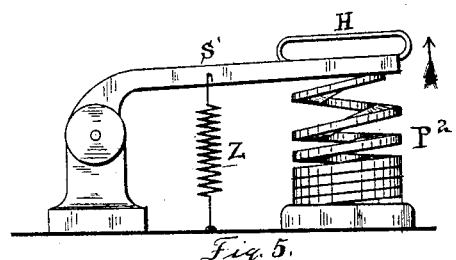

In the accompanying drawings:—Figure 1, is a side elevation of apparatus embodying my invention, three welding or metal working clamps being shown in series. Fig. 2, shows a modified arrangement. Figs. 3, 4 and 5 show in side elevation modifications of a detail of the apparatus.

In Fig. 1, D represents, as a typical or symbolical figure, any source of alternating currents of sufficient capacity, which are fed to the primary coil J, of a transformer, the secondary coil K, of which gives currents of heavy strength and of an electro motive force only sufficient to overcome the resistance of a number of metal pieces in series and solidly connected with the clamps $C^2$, $C^2$, $C^2$.

The transformer may be of any type which gives a current differing from a constant potential current in that it approaches constancy notwithstanding the variation of the resistance in the external circuit of the coil. Hence I prefer to make the transformer on which the coils J and K, are wound on sheets or masses of divided iron T, T′, with a magnetic shunting space at E, in accordance with my Patent No. 400,515, dated April 2, 1889. I in this way secure, when the currents passing in H, are of constant potential, or nearly so, a current in K, approximating constancy or uniform strength though alternating in character. The terminals of the coil K, are led directly one to each end of the series of clamps C², C², C², holding the pieces A, B, C, in abutment, as for welding.

As in my electric welding apparatus the clamps are massive and capable of carrying the current without resistance and the resistance points are between them at A, B, C, where the pieces are required to be pressed together, one of the clamps, as the right hand one of each pair, being made movable under the control of the operator, or by a spring or weight, or in any other desired way. In metal working these details will be modified, of course, to suit the kind and character of the work to be accomplished. The electric circuit is completed through the pieces A, B, C, insulation being suitably interposed to prevent its passage directly from one clamp to the other of a pair. The course of the current then is from the coil K, to the farthest clamp on the left, through the piece A, to the next clamp, then down through the base-supports to the left hand clamp of the middle pair, then through B, to the right hand clamp of the middle pair, down through the base supports and finally by the clamp on the right through C, to the other terminal of the coil K.

The passage of the current through the work in each pair of clamps may be governed by the following means: Around each pair of clamps and solidly built so as to form an effective shunt for the heavy currents are switches $S'$, $S^2$, $S^3$, which when closed, as shown to the left and right completely cut off or shunt the current from the pieces A, C, while the switch $S^2$, in the middle being uplifted by manual power is open and the current flows through the piece B.

It will be observed that the switch levers $S^2$, $S^3$, are each in permanent connection with both clamps or holders of adjoining pairs in the series circuit. Thus, for instance, switch lever $S^2$, is mounted upon a post in permanent connection with one of the clamps B, and also in permanent connection with the clamp of the pair A, which is next to the pair B. Similarly the switch lever $S^3$, is permanently connected with clamps of the pairs B and C which are themselves permanently connected. The contacts of the switches are similarly connected to the clamps and the circuit so that the operation of any switch as, for instance, $S^2$, from closed to open or vice versa, for the purpose of causing current to flow in maximum amount through the clamps B, or for cutting off the flow, will not produce any interruption of flow through other pairs of clamps as A and C.

It is preferable that the pieces of the switch be held down either by their own weight or by springs Z, Z, Z, until required to be uplifted for diverting the current through the work pieces A, B, C.

Any suitable solid, good contact may be used at the switch contacts, it being necessary that they shall be constituted to carry the heavy currents without much resistance and hence all the parts of the apparatus are preferably made of some excellent conductor like copper, and the shunts are also made firm when closed so as to carry the heavy current with ease.

If the volume of current emitted by K, be approximately the same whatever the resistance in the circuit, up to the limit of its power, then the opening of one or more of the switches $S'$, $S^2$, $S^3$, will simply divert this current through the work, while the closing of the switches will divert it through the switch away from the work, at least assuming that the switches make a much better circuit than the work pieces themselves. Hence the taking out and putting in of the pieces A, B, C, is accomplished with the switch closed and may be done *ad libitum* either together or one after the other, or in confused order, without affecting the operation. Thus three persons may be at work upon the apparatus, one at each clamp and the work of one will not affect the work of the others, the mere opening of the switches acting to divert the whole current into the pieces undergoing the welding operation or a shaping operation. The time the current is on the piece will depend on its mass and will generally be only a few seconds, according to the strength of the current. If the apparatus is of large size the time would be longer, about in proportion to the diameter of the pieces, though these conditions are subject to the widest variation. The voltage of the current supplied by the coil K, will manifestly be required to be high enough to overcome whatever resistance may at any time be in the circuit, and if it be intended that all the switches may be opened at once the voltage of the coil K, will be made to automatically rise to that potential which would force the working current through the three sets of working clamps in series, as in the figure. Of course there is no limitation as to the number of pieces which might be placed in series if the power of the coil or generator of current be adjusted accordingly.

While I have shown a transformer for producing the heating currents it is not necessarily the case that such a device be used as the currents might be taken directly from a dynamo, as in Fig. 2, the armature D, of which revolves in a magnetic field, and the terminals $K'$, $K^2$, from the commutator brushes being connected as before to the ends of the range of clamps. It is necessary that the current yielded by the dynamo be not too widely varying in strength, and a dynamo which is constructed, therefore, to give a fairly constant current strength or to give a potential which diminishes as the resistance in the circuit is diminished will serve the purpose.

Switches $S'$, $S^2$, $S^3$, may, as before, be made of any suitable construction. The switch $S'$, in Fig. 1, is shown as consisting of a forked structure dipping into a mercury cup of large size. By means of this switch it is possible to produce some variation of resistance in the current of the circuit, the opening and closing action of the switch producing for the low potential and enormously heavy currents involved, a variation of resistance which effects a variation or graduation in the current flowing to the work.

As the source of the heating current is constructed to keep the amount approximately constant on the line, it is obvious that the manipulation of a switch by any operator for the purpose of varying the heating current in his own work will not interfere with the work of other operators and for this reason and because the switch levers are connected as before set out, the whole operation of inserting a piece or pieces between any two clamps controlling the heating current therein, and afterward removing the piece or pieces, the work of any operator may be done without interfering with or interrupting in any way the work of other operators using another pair of clamps. Fig. 3, shows this arrangement more in detail, H, being a handle for opening the switch, M, a mercury cup, and Z, the spring which normally holds down the contacts of the switch.

As shown in Fig. 4, curved insulated plates may be piled up, which are pressed together by the spring Z, to form a shunting device, the resistance of which varies as the handle H, is used to lift or open the switch. With switches of this character the current flowing to the metal to be welded may be varied in accordance with the demand, the switch acting as a variable and controlled shunt.

Fig. 5, shows a metal coil $P^2$, built up of a roll of silver which, under the influence of the spring for pulling the switch down, Z, would be entirely collapsed and flat, but which on raising the handle H, expands by its elasticity into the position shown in the figure, interposing a resistance of metal between the switch contacts. The switches Figs. 4 and 5, therefore might be called variable resistance switches controlling the resistance in shunt to the welding, or other clamps, whereby no matter what the current strength supplied the whole current or any portion of it desired may be made to flow through the clamps and the work.

My invention is not limited in any way to electric welding or brazing, but it is also applicable to other operations of similar kinds, such as metal shaping, where heavy currents are to be used between clamping points through pieces which are to be worked while in the clamps, as in riveting, upsetting, bending, and shaping, &c.

What I claim as my invention is—

1. In a welding or metal working apparatus, a source of constant average current and a series of pairs of terminals for holding the piece or pieces of metal to be operated upon suitably placed in a circuit with one another between the terminals of the source, in combination with independent current varying or graduating shunting switches one for each pair of terminals, each adapted to be thrown from one extreme position to the other without interrupting the circuit through the piece or pieces which it directly controls, whereby the control of the intervals and extent of heating for any piece or pieces may be obtained without affecting the heating of other pieces in series therewith.

2. In an electric metal working apparatus, the combination with several pairs of work holders connected in series with each other by the work held thereby, of current varying switches one for each pair of work holders, said switches being connected in a series which is in parallel with the series of work holders and each switch consisting of a cup containing a liquid contact and a hinged arm bearing a forked contact, as and for the purpose described.

3. In an electric metal working apparatus, the combination with the secondary, of a number of base pieces insulated from each other and located in the circuit of said secondary, a number of pairs of work holders so located upon said base pieces that the work when adjusted therein shall span the insulation between the base pieces, and current controlling switches also located upon said base pieces and in a manner such that when closed they shall span said insulation and shunt the current from the work.

Signed at Lynn, in the county of Essex and State of Massachusetts, this 1st day of August, A. D. 1889.

ELIHU THOMSON.

Witnesses:
  JOHN W. GIBBONEY,
  A. L. ROHRER.